US012196148B1

(12) United States Patent
Gwidt et al.

(10) Patent No.: US 12,196,148 B1
(45) Date of Patent: Jan. 14, 2025

(54) DUAL FUEL INJECTOR CONTROL METHOD FOR A VEHICLE

(71) Applicant: GM Global Technology Operations LLC, Detroit, MI (US)

(72) Inventors: Jesse Michael Gwidt, Brighton, MI (US); Mark Daniel Carr, Fenton, MI (US); Jeffrey M. Hutmacher, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/755,158

(22) Filed: Jun. 26, 2024

(51) Int. Cl.
*F02D 41/40* (2006.01)
*F02D 41/38* (2006.01)

(52) U.S. Cl.
CPC ........ *F02D 41/40* (2013.01); *F02D 2041/389* (2013.01); *F02D 2200/0614* (2013.01)

(58) Field of Classification Search
CPC ............... F02D 41/40; F02D 2041/389; F02D 2200/0614
USPC .......................................................... 701/104
See application file for complete search history.

(56) References Cited

U.S. PATENT DOCUMENTS

2005/0199218 A1* 9/2005 Hashima ............. F02D 41/3094 123/431
2007/0119394 A1* 5/2007 Leone ................ F02M 25/0228 123/295
2007/0119414 A1* 5/2007 Leone .................... F02M 25/10 123/304

FOREIGN PATENT DOCUMENTS

CN 101535618 A * 9/2009 ......... F02D 41/3029

* cited by examiner

*Primary Examiner* — Mahmoud Gimie
(74) *Attorney, Agent, or Firm* — Vivacqua Crane, PLLC

(57) ABSTRACT

A method for controlling a plurality of fuel injectors for a vehicle may include determining a total fuel mass for a combustion stage in a cylinder. The method further may include determining a first injection mass for a first fuel injector and a second injection mass for a second fuel injector. A sum of the first injection mass and the second injection mass is equal to the total fuel mass. The first fuel injector and the second fuel injector are configured to provide fuel to the cylinder. A first minimum mass per pulse of the first fuel injector is greater than a second minimum mass per pulse of the second fuel injector. The method further may include controlling the first fuel injector and the second fuel injector based at least in part on the first injection mass and the second injection mass.

18 Claims, 3 Drawing Sheets

DUAL FUEL INJECTOR CONTROL METHOD FOR A VEHICLE

INTRODUCTION

The present disclosure relates to systems and methods for engine control for a vehicle, and more particularly, to systems and methods for fuel injection system control for vehicle engines.

To increase combustion engine performance and efficiency, vehicles may be equipped with combustion engines having various types of fuel injection systems. Direct injection (DI) systems utilize fuel injectors which are configured to inject fuel directly into the combustion chamber of the cylinder. Port fuel injection (PFI) systems utilize fuel injectors which are configured to inject fuel into the intake port (i.e., upstream of the intake valve and the combustion chamber). DI systems may allow for increased compression ratio relative to PFI systems, resulting in increased engine efficiency. However, the increased efficiency provided by DI systems may come at a cost of increased small particulate emissions relative to PFI systems. Therefore, injection systems utilizing both direct injection fuel injectors and port fuel injection fuel injectors (sometimes referred to as "dual injection") may be used to balance the advantages and disadvantages of DI and PFI systems. However, dual injection systems require control algorithms which account for design and implementation differences between the DI and PFI systems in order to operate the DI and PFI systems within designed operating parameters.

Thus, while engine control systems and methods achieve their intended purpose, there is a need for a new and improved system and method for controlling fuel injectors for a vehicle.

SUMMARY

According to several aspects, a method for controlling a plurality of fuel injectors for a vehicle is provided. The method may include determining a total fuel mass for a combustion stage in a cylinder. The method further may include determining a first injection mass for a first fuel injector and a second injection mass for a second fuel injector. A sum of the first injection mass and the second injection mass is equal to the total fuel mass. The first fuel injector and the second fuel injector are configured to provide fuel to the cylinder. A first minimum mass per pulse of the first fuel injector is greater than a second minimum mass per pulse of the second fuel injector. The method further may include controlling the first fuel injector and the second fuel injector based at least in part on the first injection mass and the second injection mass.

In another aspect of the present disclosure, determining the first injection mass and the second injection mass further may include determining a first pulse quantity for a first set of pulses of the first fuel injector. Determining the first injection mass and the second injection mass further may include determining a second pulse quantity for a second set of pulses of the second fuel injector. Determining the first injection mass and the second injection mass further may include determining the first injection mass and the second injection mass based at least in part on the first pulse quantity and the second pulse quantity.

In another aspect of the present disclosure, determining the first pulse quantity and the second pulse quantity further may include determining the first pulse quantity based at least in part on a predetermined initial first injector pulse quantity. Determining the first pulse quantity and the second pulse quantity further may include determining the second pulse quantity based at least in part on a predetermined initial second injector pulse quantity.

In another aspect of the present disclosure, determining the first injection mass and the second injection mass further may include determining a first set of pulse masses based at least in part on the first pulse quantity and the first injection mass. Each of the first set of pulse masses corresponds to one of the first set of pulses of the first fuel injector. Determining the first injection mass and the second injection mass further may include determining a second set of pulse masses based at least in part on the second pulse quantity and the second injection mass. Each of the second set of pulse masses corresponds to one of the second set of pulses of the second fuel injector. Determining the first injection mass and the second injection mass further may include adjusting at least one of: the first pulse quantity and the second pulse quantity based at least in part on the first set of pulse masses and the second set of pulse masses. Determining the first injection mass and the second injection mass further may include recalculating the first set of pulse masses and the second set of pulse masses in response to adjusting at least one of: the first pulse quantity and the second pulse quantity.

In another aspect of the present disclosure, determining the first injection mass and the second injection mass further may include adjusting the first injection mass and the second injection mass based at least in part on the first pulse quantity and the second pulse quantity in response to adjusting at least one of: the first pulse quantity and the second pulse quantity.

In another aspect of the present disclosure, adjusting at least one of: the first pulse quantity and the second pulse quantity further may include comparing each of the first set of pulse masses to the first minimum mass per pulse. Adjusting at least one of: the first pulse quantity and the second pulse quantity further may include comparing each of the second set of pulse masses to the second minimum mass per pulse. Adjusting at least one of: the first pulse quantity and the second pulse quantity further may include adjusting at least one of: the first pulse quantity and the second pulse quantity in response to determining that each of the first set of pulse masses is less than or equal to the first minimum mass per pulse and that each of the second set of pulse masses is less than or equal to the second minimum mass per pulse.

In another aspect of the present disclosure, adjusting at least one of: the first pulse quantity and the second pulse quantity further may include decrementing the first pulse quantity by one in response to determining that the first pulse quantity is greater than one and that each of the first set of pulse masses is less than or equal to the first minimum mass per pulse and that each of the second set of pulse masses is less than or equal to the second minimum mass per pulse.

In another aspect of the present disclosure, adjusting at least one of: the first pulse quantity and the second pulse quantity further may include decrementing the second pulse quantity by one in response to determining that the first pulse quantity is not greater than one, that the second pulse quantity is greater than one, and that each of the first set of pulse masses is less than or equal to the first minimum mass per pulse and that each of the second set of pulse masses is less than or equal to the second minimum mass per pulse.

In another aspect of the present disclosure, adjusting at least one of: the first pulse quantity and the second pulse quantity further may include disabling the first fuel injector in response to determining that that the first pulse quantity is not greater than one, that the second pulse quantity is not greater than one, and that each of the first set of pulse masses is less than or equal to the first minimum mass per pulse and that each of the second set of pulse masses is less than or equal to the second minimum mass per pulse.

In another aspect of the present disclosure, disabling the first fuel injector further may include adjusting the first injection mass to be equal to zero. Disabling the first fuel injector further may include adjusting the second injection mass to be equal to the total fuel mass.

According to several aspects, a system for controlling a plurality of fuel injectors for a vehicle is provided. The system may include a first fuel injector configured to provide fuel to a cylinder. The first fuel injector has a first minimum mass per pulse. The system further may include a second fuel injector configured to provide fuel to the cylinder. The second fuel injector has a second minimum mass per pulse. The second minimum mass per pulse is less than the first minimum mass per pulse. The system further may include a controller in electrical communication with the first fuel injector and the second fuel injector. The controller is programmed to determine a total fuel mass for a combustion stage in the cylinder. The controller is further programmed to determine a first injection mass for the first fuel injector and a second injection mass for the second fuel injector based at least in part on the total fuel mass. The controller is further programmed to control the first fuel injector and the second fuel injector based at least in part on the first injection mass and the second injection mass.

In another aspect of the present disclosure, to determine the first injection mass and the second injection mass, the controller is further programmed to determine a first pulse quantity for a first set of pulses of the first fuel injector. To determine the first injection mass and the second injection mass, the controller is further programmed to determine a second pulse quantity for a second set of pulses of the second fuel injector. To determine the first injection mass and the second injection mass, the controller is further programmed to determine the first injection mass and the second injection mass based at least in part on the first pulse quantity and the second pulse quantity.

In another aspect of the present disclosure, to determine the first injection mass and the second injection mass, the controller is further programmed to determine a first set of pulse masses based at least in part on the first pulse quantity and the first injection mass. Each of the first set of pulse masses corresponds to one of the first set of pulses of the first fuel injector. To determine the first injection mass and the second injection mass, the controller is further programmed to determine a second set of pulse masses based at least in part on the second pulse quantity and the second injection mass. Each of the second set of pulse masses corresponds to one of the second set of pulses of the second fuel injector. To determine the first injection mass and the second injection mass, the controller is further programmed to adjust at least one of: the first pulse quantity and the second pulse quantity based at least in part on the first set of pulse masses and the second set of pulse masses. To determine the first injection mass and the second injection mass, the controller is further programmed to recalculate the first set of pulse masses and the second set of pulse masses in response to adjusting at least one of: the first pulse quantity and the second pulse quantity.

In another aspect of the present disclosure, to adjust at least one of: the first pulse quantity and the second pulse quantity, the controller is further programmed to compare each of the first set of pulse masses to the first minimum mass per pulse. To adjust at least one of: the first pulse quantity and the second pulse quantity, the controller is further programmed to compare each of the second set of pulse masses to the second minimum mass per pulse. To adjust at least one of: the first pulse quantity and the second pulse quantity, the controller is further programmed to adjust at least one of: the first pulse quantity and the second pulse quantity in response to determining that each of the first set of pulse masses is less than or equal to the first minimum mass per pulse and that each of the second set of pulse masses is less than or equal to the second minimum mass per pulse.

In another aspect of the present disclosure, to adjust at least one of: the first pulse quantity and the second pulse quantity, the controller is further programmed to decrement the first pulse quantity by one in response to determining that the first pulse quantity is greater than one and that each of the first set of pulse masses is less than or equal to the first minimum mass per pulse and that each of the second set of pulse masses is less than or equal to the second minimum mass per pulse. To adjust at least one of: the first pulse quantity and the second pulse quantity, the controller is further programmed to decrement the second pulse quantity by one in response to determining that the first pulse quantity is not greater than one, that the second pulse quantity is greater than one, and that each of the first set of pulse masses is less than or equal to the first minimum mass per pulse and that each of the second set of pulse masses is less than or equal to the second minimum mass per pulse.

In another aspect of the present disclosure, to adjust at least one of: the first pulse quantity and the second pulse quantity, the controller is further programmed to disable the first fuel injector in response to determining that that the first pulse quantity is not greater than one, that the second pulse quantity is not greater than one, and that each of the first set of pulse masses is less than or equal to the first minimum mass per pulse and that each of the second set of pulse masses is less than or equal to the second minimum mass per pulse.

In another aspect of the present disclosure, the first fuel injector is a port fuel injection (PFI) fuel injector and the second fuel injector is a direct injection (DI) fuel injector.

According to several aspects, a method for controlling a plurality of fuel injectors for a vehicle is provided. The method may include determining a total fuel mass for a combustion stage in a cylinder. The method further may include determining a first pulse quantity for a first set of pulses of a first fuel injector. The first fuel injector is a port fuel injection (PFI) fuel injector configured to provide fuel to the cylinder. The first fuel injector has a first minimum mass per pulse. The method further may include determining a second pulse quantity for a second set of pulses of a second fuel injector. The second fuel injector is a direct injection (DI) fuel injector configured to provide fuel to the cylinder. The second fuel injector has a second minimum mass per pulse. The second minimum mass per pulse is less than the first minimum mass per pulse. The method further may include determining a first injection mass for the first fuel injector and a second injection mass for the second fuel injector based at least in part on the first pulse quantity and the second pulse quantity, where a sum of the first injection mass and the second injection mass is equal to the total fuel mass. The method further may include controlling the first fuel injector and the second fuel injector based at least in part on the first injection mass and the second injection mass.

In another aspect of the present disclosure, determining the first injection mass and the second injection mass further may include determining a first set of pulse masses based at least in part on the first pulse quantity and the first injection mass. Each of the first set of pulse masses corresponds to one of the first set of pulses of the first fuel injector. Determining the first injection mass and the second injection mass further may include determining a second set of pulse masses based at least in part on the second pulse quantity and the second injection mass. Each of the second set of pulse masses corresponds to one of the second set of pulses of the second fuel injector. Determining the first injection mass and the second injection mass further may include adjusting at least one of: the first pulse quantity and the second pulse quantity based at least in part on the first set of pulse masses and the second set of pulse masses. Determining the first injection mass and the second injection mass further may include recalculating the first set of pulse masses and the second set of pulse masses in response to adjusting at least one of: the first pulse quantity and the second pulse quantity.

In another aspect of the present disclosure, adjusting at least one of: the first pulse quantity and the second pulse quantity further may include comparing each of the first set of pulse masses to the first minimum mass per pulse. Adjusting at least one of: the first pulse quantity and the second pulse quantity further may include comparing each of the second set of pulse masses to the second minimum mass per pulse. Adjusting at least one of: the first pulse quantity and the second pulse quantity further may include decrementing the first pulse quantity by one in response to determining that the first pulse quantity is greater than one and that each of the first set of pulse masses is less than or equal to the first minimum mass per pulse and that each of the second set of pulse masses is less than or equal to the second minimum mass per pulse. Adjusting at least one of: the first pulse quantity and the second pulse quantity further may include decrementing the second pulse quantity by one in response to determining that the first pulse quantity is not greater than one, that the second pulse quantity is greater than one, and that each of the first set of pulse masses is less than or equal to the first minimum mass per pulse and that each of the second set of pulse masses is less than or equal to the second minimum mass per pulse. Adjusting at least one of: the first pulse quantity and the second pulse quantity further may include disabling the first fuel injector in response to determining that that the first pulse quantity is not greater than one, that the second pulse quantity is not greater than one, and that each of the first set of pulse masses is less than or equal to the first minimum mass per pulse and that each of the second set of pulse masses is less than or equal to the second minimum mass per pulse.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicle fuel injection systems utilizing both direct injection (DI) fuel injectors and port fuel injection (PFI) fuel injectors (sometimes referred to as "dual injection") may be used to balance the advantages and disadvantages of DI and PFI systems. However, dual injection systems require control algorithms which account for design and implementation differences between the DI and PFI systems in order to operate the DI and PFI systems within designed operating parameters. Therefore, the present disclosure provides a new and improved system and method for controlling a plurality of fuel injectors (e.g., DI and PFI fuel injectors) for a vehicle which ensures proper operation of the plurality of fuel injectors, even when specifications of the fuel injectors (e.g., minimum mass per pulse) differ.

Figure 1:
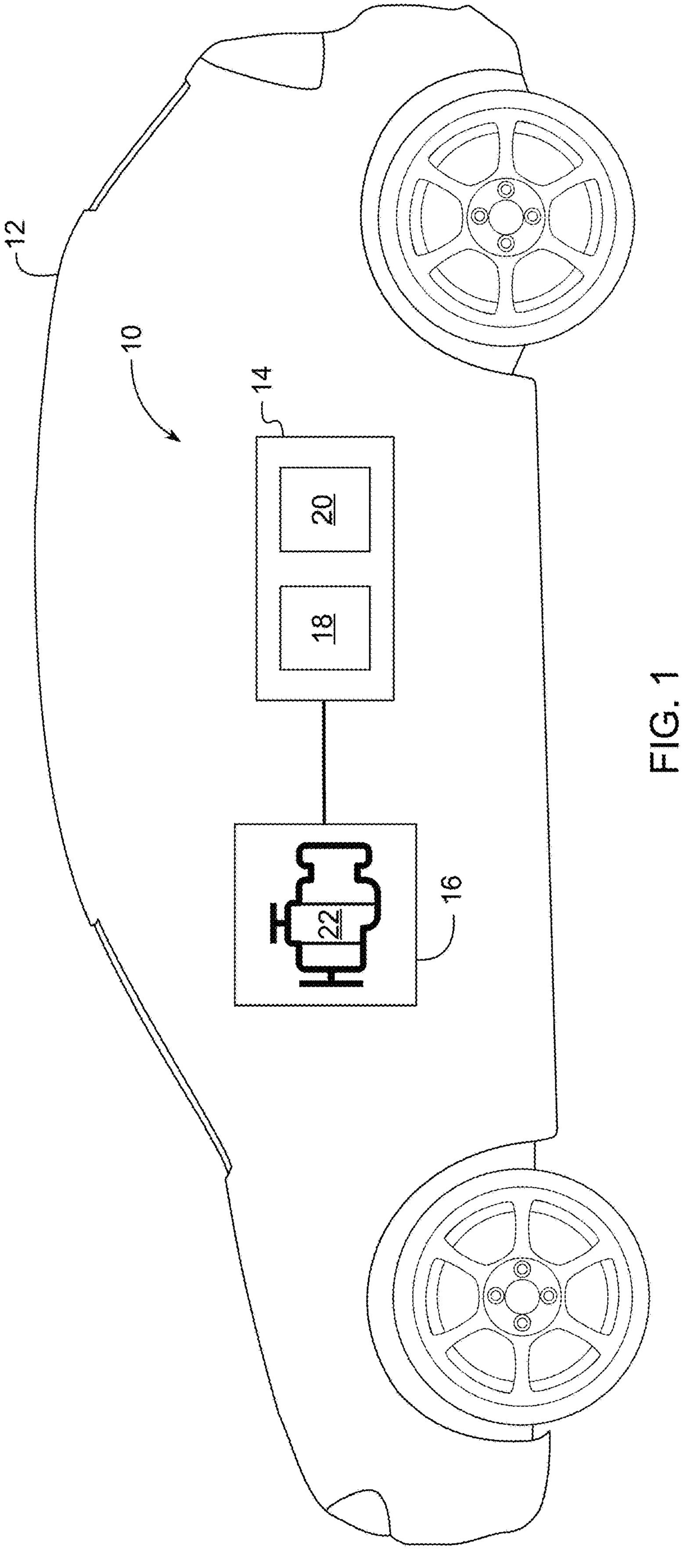
FIG. 1 is a schematic diagram of a system for controlling a plurality of fuel injectors for a vehicle, according to an exemplary embodiment.

Referring to FIG. 1, a system for controlling a plurality of fuel injectors for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14 and a combustion engine 16.

The controller 14 is used to implement a method 100 for controlling a plurality of fuel injectors for a vehicle, as will be described below. The controller 14 includes at least one processor 18 and a non-transitory computer readable storage device or media 20. The processor 18 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 20 may include volatile and nonvolatile storage in read-only memory (ROM), random-access memory (RAM), and keep-alive memory (KAM), for example. KAM is a persistent or non-volatile memory that may be used to store various operating variables while the processor 18 is powered down. The computer-readable storage device or media 20 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the combustion engine 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The combustion engine 16 is used to convert fuel into mechanical energy to power the vehicle 12. In an exemplary embodiment, the combustion engine 16 is an internal combustion engine (ICE). In a non-limiting example, the combustion engine 16 includes at least one cylinder assembly 22. The cylinder assembly 22 performs a combustion cycle to produce mechanical energy, as will be discussed below.

Figure 2:
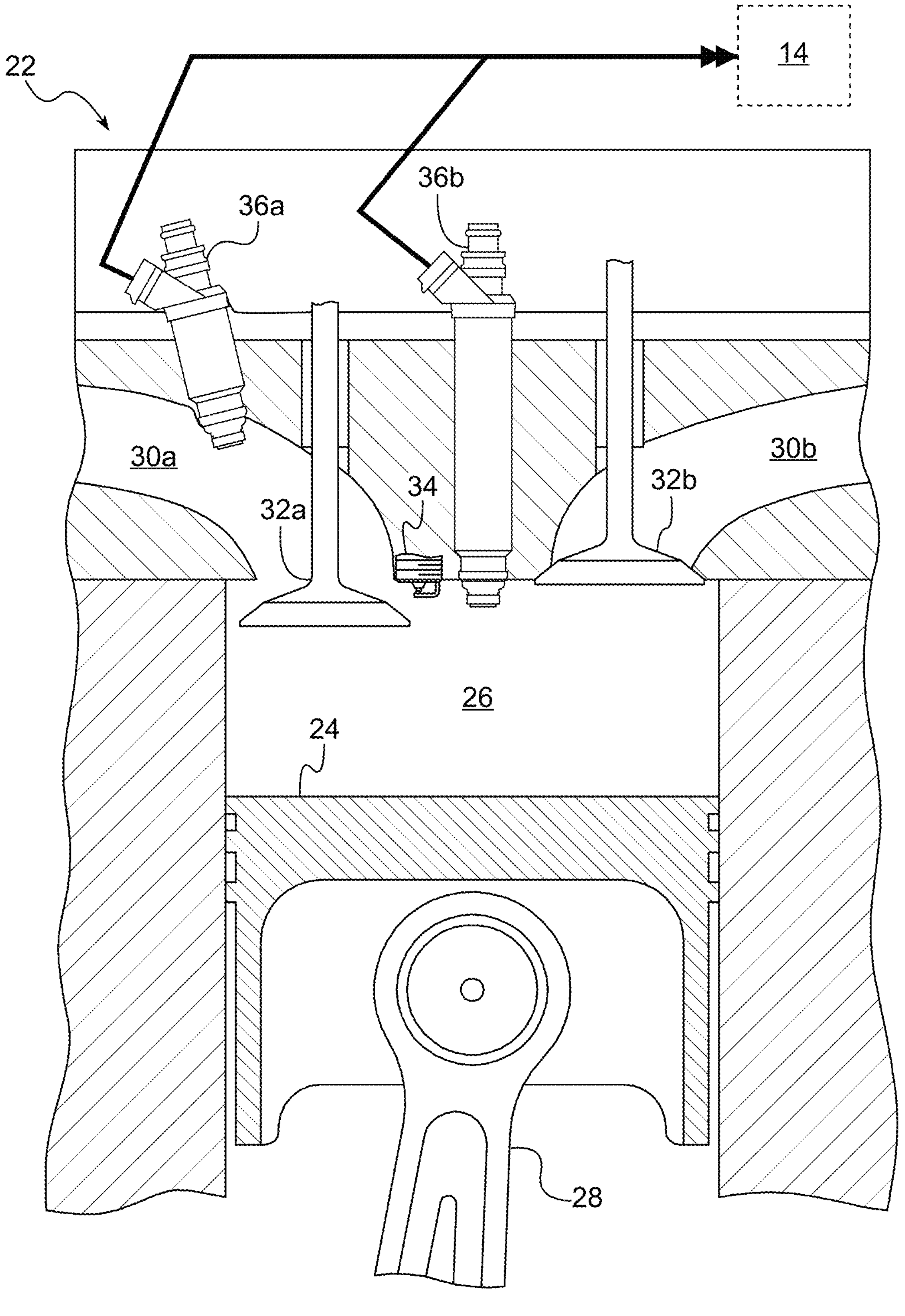
FIG. 2 is a schematic diagram of a cylinder assembly of a combustion engine of the vehicle, according to an exemplary embodiment.

Referring to FIG. 2, a schematic diagram of the cylinder assembly 22 is shown. While a single cylinder assembly 22 is shown, it should be understood that the combustion engine 16 may include a plurality of cylinder assemblies without departing from the scope of the present disclosure. In an exemplary embodiment, the cylinder assembly 22 includes a piston 24 movable within a combustion chamber 26 and coupled with a crankshaft (not shown) by a connecting rod 28. The combustion chamber 26 receives air and/or fuel via an intake port 30*a* and expels exhaust gases via an exhaust port 30*b*. Gas flow between the combustion chamber 26 and the intake port 30*a* is controlled by an intake valve 32*a*. Gas flow between the combustion chamber 26 and the exhaust port 30*b* is controlled by an exhaust valve 32*b*. In a non-limiting example, the intake valve 32*a* and the exhaust valve 32*b* are actuated by cams (not shown) on a camshaft (not shown). The cylinder assembly 22 further includes a spark plug 34 to ignite a fuel-air mixture in the combustion chamber 26.

The cylinder assembly 22 further includes a first fuel injector 36*a* and a second fuel injector 36*b*. The first fuel injector 36*a* and the second fuel injector 36*b* are used to deliver precise amounts of fuel (e.g., gasoline) into the combustion chamber 26. In an exemplary embodiment, the first fuel injector 36*a* and the second fuel injector 36*b* are electronically controlled fuel injectors. In a non-limiting example, the first fuel injector 36*a* and the second fuel injector 36*b* each include a solenoid valve (not shown) and a nozzle (not shown). The solenoid valve regulates the flow of fuel (e.g., gasoline), and the nozzle atomizes the fuel (e.g., gasoline) into a fine mist. The solenoid valve is electronically controlled by the controller 14 to inject fuel (e.g., gasoline) into the combustion chamber 26 at the optimum time in the combustion cycle and in the optimum quantity for optimal combustion efficiency. In a non-limiting example, the solenoid valve is actuated with "pulses". In the scope of the present disclosure, a pulse is an injection of fuel during actuation of the solenoid valve. Each pulse has a pulse width which defines a time for which the solenoid valve is open per pulse, and thus an amount of fuel (typically measured in units of mass) injected per pulse. For example, the solenoid valve may be excited by a square wave signal to provide a set of pulses of fuel injection. A duty cycle of the square wave signal is controlled in order to adjust the amount of fuel injected per pulse. It should be understood that the solenoid valve may be excited by a non-periodic signal and/or signals having varying frequency and/or varying duty cycle over time. The first fuel injector 36*a* and the second fuel injector 36*b* are in electrical communication with the controller 14 to provide control signals to the solenoid valve of each of the first fuel injector 36*a* and the second fuel injector 36*b*.

Due to electro-mechanical design of the first fuel injector 36*a* and the second fuel injector 36*b* and/or electrical design of the control system (i.e., the controller 14), a minimum mass per pulse is defined for each of the first fuel injector 36*a* and the second fuel injector 36*b*. In the scope of the present disclosure, the minimum mass per pulse is a minimum fuel mass which a fuel injector is capable of injecting per injection pulse. A first minimum mass per pulse is defined for the first fuel injector 36*a* and a second minimum mass per pulse is defined for the second fuel injector 36*b*. In a non-limiting example, the first minimum mass per pulse and the second minimum mass per pulse are predetermined using simulation and/or laboratory testing and saved in the media 20 of the controller 14. Operating fuel injectors below the minimum mass per pulse may result in a non-deterministic amount of fuel injection per pulse. Therefore, it is advantageous to operate fuel injectors at or above minimum mass per pulse to ensure accurate combustion control.

In a non-limiting example, the first fuel injector 36*a* is a port fuel injection fuel injector (PFI) designed to inject fuel into the intake port 30*a* to be carried into the combustion chamber 26 by gas flow in the intake port 30*a*. The second fuel injector 36*b* is a direct injection fuel injector (DI) designed to inject fuel directly into the combustion chamber 26. In a non-limiting example, the first minimum mass per pulse of the first fuel injector 36*a* is greater than the second minimum mass per pulse of the second fuel injector 36*b*. For example, the first minimum mass per pulse may be between 4-6 milligrams and the second minimum mass per pulse may be between 2-3 milligrams. It should be understood that the types of fuel injector and mass per pulse values provided above are merely exemplary in nature, and that the present disclosure is applicable to any fuel injection system having two or more fuel injectors per cylinder.

In an exemplary embodiment, the combustion cycle includes four stages (also referred to as strokes). The intake stage begins when the piston 24 is located at top dead center (TDC). As the piston moves downward, the intake valve 32*a* is opened, and gases are sucked into the combustion chamber 26 from the intake port 30*a*. Furthermore, the first fuel injector 36*a* and/or the second fuel injector 36*b* are actuated, providing fuel for the fuel-air mixture.

In a non-limiting example, the first fuel injector 36*a* is actuated with a first set of pulses including a first pulse quantity of pulses. Each of the first set of pulses dispenses one of a first set of pulse masses of fuel. The first pulse quantity of pulses may be any integer, including zero if the first fuel injector 36*a* is deactivated. Each of the first set of pulse masses is a fuel mass corresponding to one of the first set of pulses. Each of the first set of pulse masses may have same or differing values. To ensure proper operation of the first fuel injector 36*a*, each of the first set of pulse masses should be greater than or equal to the first minimum mass per pulse of the first fuel injector 36*a*.

In a non-limiting example, the second fuel injector 36*b* is actuated with a second set of pulses including a second pulse quantity of pulses. Each of the second set of pulses dispenses one of a second set of pulse masses of fuel. The second pulse quantity of pulses may be any integer, including zero if the second fuel injector 36*b* is deactivated. Each of the second set of pulse masses is a fuel mass corresponding to one of the second set of pulses. Each of the second set of pulse masses may have same or differing values. To ensure proper operation of the second fuel injector 36*b*, each of the second set of pulse masses should be greater than or equal to the second minimum mass per pulse of the second fuel injector 36*b*.

When the piston 24 reaches bottom dead center (BDC), the intake valve 32*a* closes and the compression stage begins. As the piston 24 moves upward, the fuel-air mixture within the combustion chamber 26 is compressed. Once the piston 24 reaches top dead center (TDC) once again, the combustion stage begins, and the compressed fuel-air mixture is ignited by the spark plug 34. During the combustion stage, the combustion of the fuel-air mixture drives the piston 24 downward, providing mechanical energy to the crankshaft (not shown). Once the piston 24 reaches bottom dead center (BDC) once again, the exhaust stage begins. During the exhaust stage, the exhaust valve 32*b* opens, and the piston 24 moves upward, expelling exhaust gases from the combustion stage into the exhaust port 30*b*. After expulsion of the exhaust gases, the exhaust valve 32*b* closes, and the combustion cycle is completed and may be repeated to produce additional mechanical energy.

Figure 3:
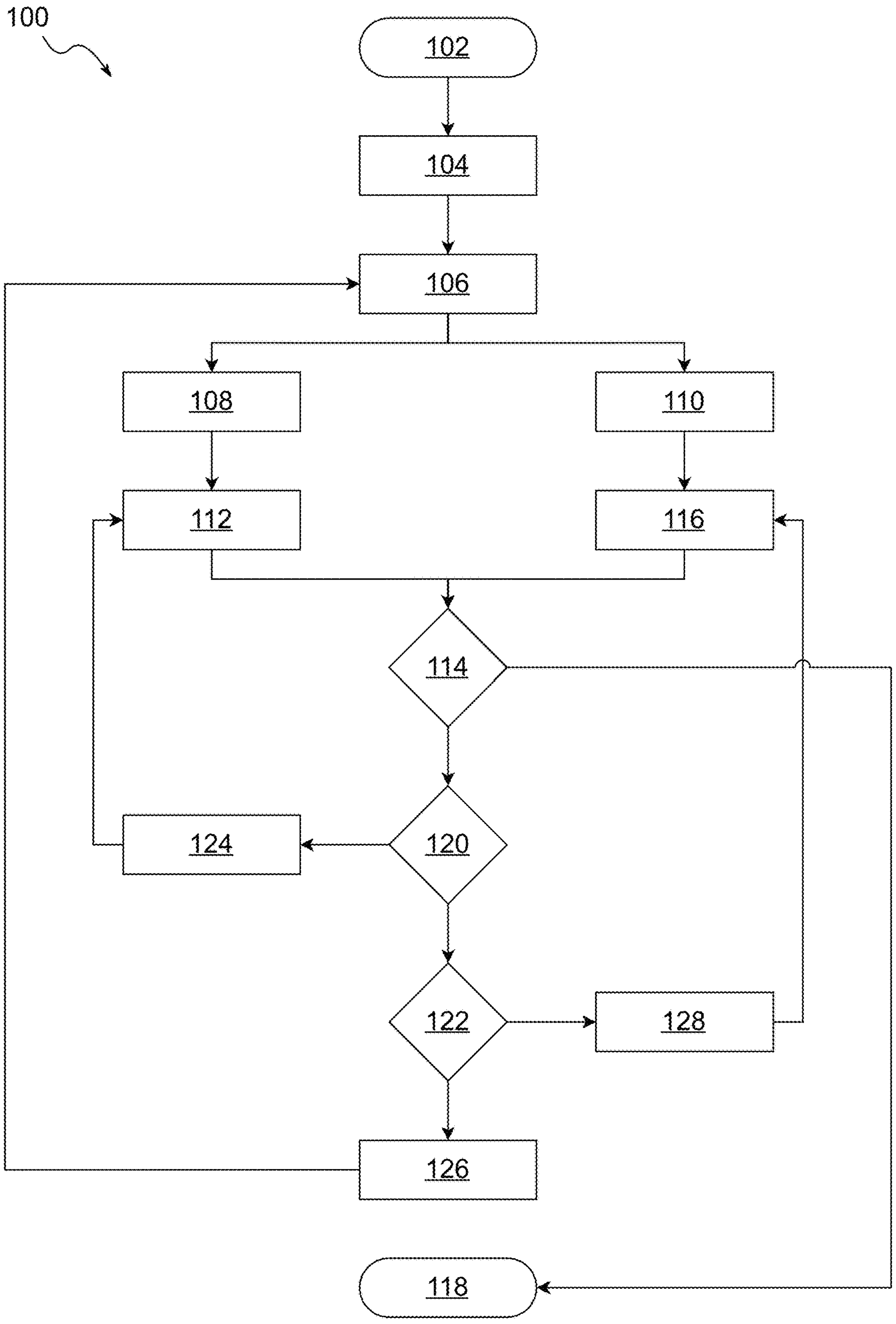
FIG. 3 is a flowchart of a method for controlling a plurality of fuel injectors, according to an exemplary embodiment.

Referring to FIG. 3, a flowchart of the method 100 for controlling a plurality of fuel injectors is shown. The method 100 begins at block 102 and proceeds to block 104. At block 104, the controller 14 determines a total fuel mass required for the combustion stage. In an exemplary embodiment, the controller 14 determines the total fuel mass based on multiple factors and/or measurements, including, for example, intake air mass (e.g., measured using a mass air flow (MAF) or a manifold absolute pressure (MAP) sensor), intake air temperature, throttle position, exhaust oxygen content, engine speed, engine load, engine temperature, and/or the like. In a non-limiting example, the controller 14 uses various algorithms and/or look up tables to determine the total fuel mass based on any combination of the aforementioned factors. It should be understood that the above discussion is merely exemplary in nature, and that various additional and/or alternative methods for determining the total fuel mass, including methods utilizing additional and/or alternative sensors or algorithms, are within the scope of the present disclosure. After block 104, the method 100 proceeds to block 106.

At block 106, the controller 14 divides the total fuel mass determined at block 104 between a first injection mass for the first fuel injector 36*a* and a second injection mass for the second fuel injector 36*b*, such that a sum of the first injection mass and the second injection mass is equal to the total fuel mass determined at block 104. In an exemplary embodiment, to divide the total fuel mass among the first fuel injector 36*a* and the second fuel injector 36*b*, the controller 14 uses a predetermined initial fuel mass ratio. In a non-limiting example, the predetermined initial fuel mass ratio may be 50:50, meaning that the first injection mass is equal to the second injection mass. In another non-limiting example, the predetermined initial fuel mass ratio may be 25:75, meaning that the first injection mass is equal to twenty five percent of the total fuel mass and the second injection mass is equal to seventy five percent of the total fuel mass.

In another exemplary embodiment, the predetermined initial fuel mass ratio is determined by querying a look up table stored in the media 20 of the controller 14 based on factors such as, for example, intake air mass, intake air temperature, throttle position, exhaust oxygen content, engine speed, engine load, engine temperature, and/or the like. In another exemplary embodiment, if the first fuel injector 36*a* is completely disabled, the first injection mass is set equal to zero and the second injection mass is set equal to the total fuel mass. In another exemplary embodiment, if the second fuel injector 36*b* is completely disabled, the first injection mass is set equal to the total fuel mass and the second injection mass is set equal to zero. The first injection mass and the second injection mass are stored in the media 20 of the controller 14 as mutable variables which may be modified during subsequent method steps, as will be discussed below. It should be understood that the above discussion is merely exemplary in nature, and that various additional and/or alternative methods for dividing the total fuel mass between the first injection mass for the first fuel injector 36*a* and the second injection mass for the second fuel injector 36*b*, including methods utilizing additional and/or alternative sensors or algorithms, are within the scope of the present disclosure. After block 106, the method 100 proceeds to blocks 108 and 110.

At block 108, the controller 14 determines the first pulse quantity for the first set of pulses of the first fuel injector 36*a*. In an exemplary embodiment, the first pulse quantity is initially determined based at least in part on a predetermined initial first injector pulse quantity (e.g., one pulse) stored in the media 20. In another exemplary embodiment, the predetermined initial first injector pulse quantity is determined by querying a look up table stored in the media 20 of the controller 14 based on factors such as, for example, intake air mass, intake air temperature, throttle position, exhaust oxygen content, engine speed, engine load, engine temperature, and/or the like. In another exemplary embodiment, if the first fuel injector 36*a* is completely disabled, the first pulse quantity is set equal to zero. The first pulse quantity is stored in the media 20 of the controller 14 as a mutable variable which may be modified during subsequent method steps, as will be discussed below. It should be understood that the above discussion is merely exemplary in nature, and that various additional and/or alternative methods for determining the first pulse quantity for the first set of pulses of the first fuel injector 36*a*, including methods utilizing additional and/or alternative sensors or algorithms, are within the scope of the present disclosure. After block 108, the method 100 proceeds to block 112.

At block 112, the controller 14 determines the first set of pulse masses. In an exemplary embodiment, the first set of pulse masses are determined based at least in part on the first pulse quantity determined at block 108 and the first injection mass determined at block 106. In a non-limiting example, the first set of pulse masses are determined such as to equally divide the first injection mass between the first set of pulses. In another exemplary embodiment, the first set of pulse masses are determined by querying a look up table stored in the media 20 of the controller 14 based on factors such as, for example, intake air mass, intake air temperature, throttle position, exhaust oxygen content, engine speed, engine load, engine temperature, and/or the like. In another exemplary embodiment, if the first fuel injector 36*a* is completely disabled, the first set of pulse masses are all set equal to zero. The first set of pulse masses are stored in the media 20 of the controller 14 as mutable variables which may be modified during subsequent method steps. It should be understood that the above discussion is merely exemplary in nature, and that various additional and/or alternative methods for determining the first set of pulse masses for the first set of pulses of the first fuel injector 36*a*, including methods utilizing additional and/or alternative sensors or algorithms, are within the scope of the present disclosure. After block 112, the method 100 proceeds to block 114, as will be discussed in greater detail below.

At block 110, the controller 14 determines the second pulse quantity for the second set of pulses of the second fuel injector 36*b*. In an exemplary embodiment, the second pulse quantity is initially determined based at least in part on a predetermined initial second injector pulse quantity (e.g., three pulses) stored in the media 20. In another exemplary embodiment, the predetermined initial second injector pulse quantity is determined by querying a look up table stored in the media 20 of the controller 14 based on factors such as, for example, intake air mass, intake air temperature, throttle position, exhaust oxygen content, engine speed, engine load, engine temperature, and/or the like. In another exemplary embodiment, if the second fuel injector 36*b* is completely disabled, the second pulse quantity is set equal to zero. The second pulse quantity is stored in the media 20 of the controller 14 as a mutable variable which may be modified during subsequent method steps, as will be discussed below. It should be understood that the above discussion is merely exemplary in nature, and that various additional and/or alternative methods for determining the second pulse quantity for the second set of pulses of the second fuel injector 36*b*, including methods utilizing additional and/or alternative sensors or algorithms, are within the scope of the present disclosure. After block 110, the method 100 proceeds to block 116.

At block 116, the controller 14 determines the second set of pulse masses. In an exemplary embodiment, the second set of pulse masses are determined based at least in part on the second pulse quantity determined at block 110 and the second injection mass determined at block 106. In a non-limiting example, the second set of pulse masses are determined such as to equally divide the second injection mass between the second set of pulses. In another exemplary embodiment, the second set of pulse masses are determined by querying a look up table stored in the media 20 of the controller 14 based on factors such as, for example, intake air mass, intake air temperature, throttle position, exhaust oxygen content, engine speed, engine load, engine temperature, and/or the like. In another exemplary embodiment, if the second fuel injector 36*b* is completely disabled, the second set of pulse masses are all set equal to zero. The second set of pulse masses are stored in the media 20 of the controller 14 as mutable variables which may be modified during subsequent method steps. It should be understood that the above discussion is merely exemplary in nature, and that various additional and/or alternative methods for determining the second set of pulse masses for the second set of pulses of the second fuel injector 36*b*, including methods utilizing additional and/or alternative sensors or algorithms, are within the scope of the present disclosure. After block 116, the method 100 proceeds to block 114.

At block 114, the controller 14 compares each of the first set of pulse masses to the first minimum mass per pulse. Furthermore, the controller 14 compares each of the second set of pulse masses to the second minimum mass per pulse. If all of the first set of pulse masses are greater than the first minimum mass per pulse AND if all of the second set of pulse masses are greater than the second minimum mass per pulse, the method 100 proceeds to enter a standby state at block 118. If any of the first set of pulse masses is less than or equal to the first minimum mass per pulse OR if any of the second set of pulse masses is less than or equal to the second minimum mass per pulse, the method 100 proceeds to block 120.

At block 120, the controller 14 compares the first pulse quantity to one. If the first pulse quantity is less than or equal to one, the method 100 proceeds to block 122, as will be discussed in greater detail below. If the first pulse quantity is greater than one, the method 100 proceeds to block 124.

At block 124, the controller 14 decrements the first pulse quantity by one. After block 124, the method 100 returns to block 112 to recalculate the first set of pulse masses based on the newly decremented first pulse quantity. In some embodiments, after block 124, the method 100 returns to block 106 to adjust the first injection mass based at least in part on the newly decremented first pulse quantity.

At block 122, the controller 14 compares the second pulse quantity to one. If the second pulse quantity is less than or equal to one, the method 100 proceeds to block 126, as will be discussed in greater detail below. If the second pulse quantity is greater than one, the method 100 proceeds to block 128.

At block 128, the controller 14 decrements the second pulse quantity by one. After block 128, the method 100 returns to block 116 to recalculate the second set of pulse masses based on the newly decremented second pulse quantity. In some embodiments, after block 128, the method 100 returns to block 106 to adjust the second injection mass based at least in part on the newly decremented second pulse quantity.

At block 126, the controller 14 disables the first fuel injector 36*a*. In the scope of the present disclosure, disabling the first fuel injector 36*a* means that the first fuel injector 36*a* is not used for the combustion cycle, and the total fuel mass is injected by the second fuel injector 36*b*. After block 126, the method 100 returns to block 106 to adjust the first injection mass (i.e., set the first injection mass to zero) and the second injection mass (i.e., set the second injection mass to be equal to the total fuel mass).

In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds.

In an exemplary embodiment, the method 100 further includes mechanisms for incrementing the first pulse quantity and/or the second pulse quantity and/or re-enabling the first fuel injector 36*a*. In a non-limiting example, the first pulse quantity and/or the second pulse quantity are incremented and/or the first fuel injector 36*a* is re-enabled in response to an increase in intake air mass, throttle position, engine speed, engine load, and/or the like.

The system 10 and method 100 of the present disclosure offer several advantages. The system 10 and method 100 allow efficient and effective operation of the combustion engine 16 with one or more cylinder assemblies having multiple fuel injectors with differing minimum mass per pulse specifications. Using the system 10 and method 100, fuel distribution between injectors, pulse quantity per injector, and fuel mass injected per pulse may be adjusted based on engine load and optimized to operate all fuel injectors at or above minimum mass per pulse specifications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling a plurality of fuel injectors for a vehicle, the method comprising:

determining a total fuel mass for a combustion stage in a cylinder;

determining a first injection mass for a first fuel injector and a second injection mass for a second fuel injector, wherein a sum of the first injection mass and the second injection mass is equal to the total fuel mass, wherein the first fuel injector and the second fuel injector are configured to provide fuel to the cylinder, and wherein a first minimum mass per pulse of the first fuel injector is greater than a second minimum mass per pulse of the second fuel injector, wherein determining the first injection mass and the second injection mass further comprises:

determining a first pulse quantity for a first set of pulses of the first fuel injector;

determining a second pulse quantity for a second set of pulses of the second fuel injector; and determining the first injection mass and the second injection mass based at least in part on the first pulse quantity and the second pulse quantity; and controlling the first fuel injector and the second fuel injector based at least in part on the first injection mass and the second injection mass.

2. The method of claim 1, wherein determining the first pulse quantity and the second pulse quantity further comprises:

determining the first pulse quantity based at least in part on a predetermined initial first injector pulse quantity; and determining the second pulse quantity based at least in part on a predetermined initial second injector pulse quantity.

3. The method of claim 1, wherein determining the first injection mass and the second injection mass further comprises:

determining a first set of pulse masses based at least in part on the first pulse quantity and the first injection mass, wherein each of the first set of pulse masses corresponds to one of the first set of pulses of the first fuel injector;

determining a second set of pulse masses based at least in part on the second pulse quantity and the second injection mass, wherein each of the second set of pulse masses corresponds to one of the second set of pulses of the second fuel injector;

adjusting at least one of: the first pulse quantity and the second pulse quantity based at least in part on the first set of pulse masses and the second set of pulse masses; and recalculating the first set of pulse masses and the second set of pulse masses in response to adjusting at least one of: the first pulse quantity and the second pulse quantity.

4. The method of claim 3, wherein determining the first injection mass and the second injection mass further comprises:

adjusting the first injection mass and the second injection mass based at least in part on the first pulse quantity and the second pulse quantity in response to adjusting at least one of: the first pulse quantity and the second pulse quantity.

5. The method of claim 3, wherein adjusting at least one of: the first pulse quantity and the second pulse quantity further comprises:

comparing each of the first set of pulse masses to the first minimum mass per pulse;

comparing each of the second set of pulse masses to the second minimum mass per pulse; and adjusting at least one of: the first pulse quantity and the second pulse quantity in response to determining that each of the first set of pulse masses is less than or equal to the first minimum mass per pulse and that each of the second set of pulse masses is less than or equal to the second minimum mass per pulse.

6. The method of claim 5, wherein adjusting at least one of: the first pulse quantity and the second pulse quantity further comprises:

decrementing the first pulse quantity by one in response to determining that the first pulse quantity is greater than one and that each of the first set of pulse masses is less than or equal to the first minimum mass per pulse and that each of the second set of pulse masses is less than or equal to the second minimum mass per pulse.

7. The method of claim 5, wherein adjusting at least one of: the first pulse quantity and the second pulse quantity further comprises:

decrementing the second pulse quantity by one in response to determining that the first pulse quantity is not greater than one, that the second pulse quantity is greater than one, and that each of the first set of pulse masses is less than or equal to the first minimum mass per pulse and that each of the second set of pulse masses is less than or equal to the second minimum mass per pulse.

8. The method of claim 5, wherein adjusting at least one of: the first pulse quantity and the second pulse quantity further comprises:

disabling the first fuel injector in response to determining that that the first pulse quantity is not greater than one, that the second pulse quantity is not greater than one, and that each of the first set of pulse masses is less than or equal to the first minimum mass per pulse and that each of the second set of pulse masses is less than or equal to the second minimum mass per pulse.

9. The method of claim 8, wherein disabling the first fuel injector further comprises:

adjusting the first injection mass to be equal to zero; and adjusting the second injection mass to be equal to the total fuel mass.

10. A system for controlling a plurality of fuel injectors for a vehicle, the system comprising:

a first fuel injector configured to provide fuel to a cylinder, wherein the first fuel injector has a first minimum mass per pulse;

a second fuel injector configured to provide fuel to the cylinder, wherein the second fuel injector has a second minimum mass per pulse, and wherein the second minimum mass per pulse is less than the first minimum mass per pulse; and a controller in electrical communication with the first fuel injector and the second fuel injector, wherein the controller is programmed to:

determine a total fuel mass for a combustion stage in the cylinder;

determine a first injection mass for the first fuel injector and a second injection mass for the second fuel injector based at least in part on the total fuel mass, wherein to determine the first injection mass and the second injection mass, the controller is further programmed to:

determine a first pulse quantity for a first set of pulses of the first fuel injector;

determine a second pulse quantity for a second set of pulses of the second fuel injector; and determine the first injection mass and the second injection mass based at least in part on the first pulse quantity and the second pulse quantity; and control the first fuel injector and the second fuel injector based at least in part on the first injection mass and the second injection mass.

11. The system of claim 10, wherein to determine the first injection mass and the second injection mass, the controller is further programmed to:

determine a first set of pulse masses based at least in part on the first pulse quantity and the first injection mass, wherein each of the first set of pulse masses corresponds to one of the first set of pulses of the first fuel injector;

determine a second set of pulse masses based at least in part on the second pulse quantity and the second injection mass, wherein each of the second set of pulse masses corresponds to one of the second set of pulses of the second fuel injector;

adjust at least one of: the first pulse quantity and the second pulse quantity based at least in part on the first set of pulse masses and the second set of pulse masses; and recalculate the first set of pulse masses and the second set of pulse masses in response to adjusting at least one of: the first pulse quantity and the second pulse quantity.

12. The system of claim 11, wherein to adjust at least one of: the first pulse quantity and the second pulse quantity, the controller is further programmed to:

compare each of the first set of pulse masses to the first minimum mass per pulse;

compare each of the second set of pulse masses to the second minimum mass per pulse; and adjust at least one of: the first pulse quantity and the second pulse quantity in response to determining that each of the first set of pulse masses is less than or equal to the first minimum mass per pulse and that each of the second set of pulse masses is less than or equal to the second minimum mass per pulse.

13. The system of claim 12, wherein to adjust at least one of: the first pulse quantity and the second pulse quantity, the controller is further programmed to:

decrement the first pulse quantity by one in response to determining that the first pulse quantity is greater than one and that each of the first set of pulse masses is less than or equal to the first minimum mass per pulse and that each of the second set of pulse masses is less than or equal to the second minimum mass per pulse; and decrement the second pulse quantity by one in response to determining that the first pulse quantity is not greater than one, that the second pulse quantity is greater than one, and that each of the first set of pulse masses is less than or equal to the first minimum mass per pulse and that each of the second set of pulse masses is less than or equal to the second minimum mass per pulse.

14. The system of claim 13, wherein to adjust at least one of: the first pulse quantity and the second pulse quantity, the controller is further programmed to:

disable the first fuel injector in response to determining that that the first pulse quantity is not greater than one, that the second pulse quantity is not greater than one, and that each of the first set of pulse masses is less than or equal to the first minimum mass per pulse and that each of the second set of pulse masses is less than or equal to the second minimum mass per pulse.

15. The system of claim 14, wherein the first fuel injector is a port fuel injection (PFI) fuel injector and the second fuel injector is a direct injection (DI) fuel injector.

16. A method for controlling a plurality of fuel injectors for a vehicle, the method comprising:

determining a total fuel mass for a combustion stage in a cylinder;

determining a first pulse quantity for a first set of pulses of a first fuel injector, wherein the first fuel injector is a port fuel injection (PFI) fuel injector configured to provide fuel to the cylinder, and wherein the first fuel injector has a first minimum mass per pulse;

determining a second pulse quantity for a second set of pulses of a second fuel injector, wherein the second fuel injector is a direct injection (DI) fuel injector configured to provide fuel to the cylinder, wherein the second fuel injector has a second minimum mass per pulse, and wherein the second minimum mass per pulse is less than the first minimum mass per pulse;

determining a first injection mass for the first fuel injector and a second injection mass for the second fuel injector based at least in part on the first pulse quantity and the second pulse quantity, wherein a sum of the first injection mass and the second injection mass is equal to the total fuel mass; and controlling the first fuel injector and the second fuel injector based at least in part on the first injection mass and the second injection mass.

17. The method of claim 16, wherein determining the first injection mass and the second injection mass further comprises:

determining a first set of pulse masses based at least in part on the first pulse quantity and the first injection mass, wherein each of the first set of pulse masses corresponds to one of the first set of pulses of the first fuel injector;

determining a second set of pulse masses based at least in part on the second pulse quantity and the second injection mass, wherein each of the second set of pulse masses corresponds to one of the second set of pulses of the second fuel injector;

adjusting at least one of: the first pulse quantity and the second pulse quantity based at least in part on the first set of pulse masses and the second set of pulse masses; and recalculating the first set of pulse masses and the second set of pulse masses in response to adjusting at least one of: the first pulse quantity and the second pulse quantity.

18. The method of claim 16, wherein adjusting at least one of: the first pulse quantity and the second pulse quantity further comprises:

comparing each of the first set of pulse masses to the first minimum mass per pulse;

comparing each of the second set of pulse masses to the second minimum mass per pulse;

decrementing the first pulse quantity by one in response to determining that the first pulse quantity is greater than one and that each of the first set of pulse masses is less than or equal to the first minimum mass per pulse and that each of the second set of pulse masses is less than or equal to the second minimum mass per pulse;

decrementing the second pulse quantity by one in response to determining that the first pulse quantity is not greater than one, that the second pulse quantity is greater than one, and that each of the first set of pulse masses is less than or equal to the first minimum mass per pulse and that each of the second set of pulse masses is less than or equal to the second minimum mass per pulse; and disabling the first fuel injector in response to determining that that the first pulse quantity is not greater than one, that the second pulse quantity is not greater than one, and that each of the first set of pulse masses is less than or equal to the first minimum mass per pulse and that each of the second set of pulse masses is less than or equal to the second minimum mass per pulse.

* * * * *